Dec. 15, 1931.   H. C. BUFFINGTON   1,837,108
SCRAPER OR GRADER
Filed Jan. 12, 1929          7 Sheets-Sheet 1

Inventor
Harry C. Buffington
By Milans & Milans
Attorneys

Dec. 15, 1931.  H. C. BUFFINGTON  1,837,108
SCRAPER OR GRADER
Filed Jan. 12, 1929   7 Sheets-Sheet 3

Fig. 3.

Inventor
Harry C. Buffington
By Milano Milano
Attorneys

Dec. 15, 1931.　　H. C. BUFFINGTON　　1,837,108
SCRAPER OR GRADER
Filed Jan. 12, 1929　　7 Sheets-Sheet 4

Inventor
Harry C. Buffington
By Milans Milans
Attorneys

Dec. 15, 1931.      H. C. BUFFINGTON      1,837,108
SCRAPER OR GRADER
Filed Jan. 12, 1929      7 Sheets-Sheet 6

Inventor
Harry C. Buffington
By Milans Milans
Attorneys

Patented Dec. 15, 1931

1,837,108

UNITED STATES PATENT OFFICE

HARRY C. BUFFINGTON, OF SPRINGFIELD, ILLINOIS, ASSIGNOR TO THE BAKER MANUFACTURING COMPANY, OF SPRINGFIELD, ILLINOIS, A CORPORATION OF ILLINOIS

SCRAPER OR GRADER

Application filed January 12, 1929. Serial No. 332,038.

My invention relates to new and useful improvements in scrapers or graders and more particularly to a back filler or plow, the principal object of the invention residing in the provision of a device of the character described in which the back filler or plow is connected to a tractor, preferably of the caterpillar or endless track type, in such a manner that it may be raised or lowered to inoperative or operative position and in which the power or pull is taken off the tracks of the tractor instead of the draw bar thereof.

Another object of the invention consists in forming the back filler or plow with a frame which entirely surrounds the tractor, the frame having a blade secured to its forward end while the rear end thereof is connected to the tractor in a novel manner whereby the forward or blade end may be raised or lowered, the connection between the frame and tractor being such that the position of the blade will not be effected by the movement of the tractor over uneven ground.

A further object of the invention resides in providing connecting bars or links between the track frames of the tractor and the frame of the back filler or plow, said bars or links being secured to the track frame in a novel manner by brackets positioned on the frame in alignment with the rear axle of the tractor or adjacent thereto, the bars or links causing the power or pull for the back filler or plow to be taken from the tracks of the tractor and causing an even pull on the back filler or plow frame.

A still further object of the invention consists in the provision of a jack or ram carried by the frame of the back filler or plow for raising and lowering the back filler or plow, means extending from the jack or ram and engaging the side beams of the back filler or plow intermediate the ends thereof so that when the jack or ram is operated the frame will be raised or lowered, the means extending from the jack or ram being connected to the tractor and engaging a pulley or the like supported and carried by the frame of the back filler or plow.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

Figure 10:
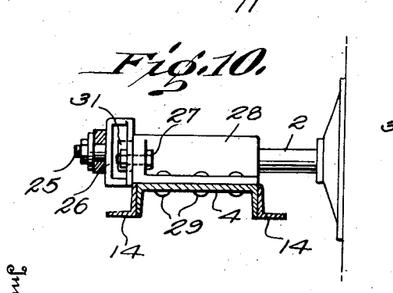
Figs. 10 and 11 are details showing the bracket, secured to the track frame, and forming a connection for one end of the bars or links which connect the tractor to the frame of the back filler or plow.

In the drawings 1 indicates a tractor of well-known construction including a rear axle 2 and a front axle 3 which support, at opposite sides of the tractor, a track frame 4, at opposite ends of which, are mounted the sprocket wheels 5 and 6 around which operate the endless tracks 7. The sprocket wheels 5 are driven from the drive shaft 8 through means on the chain 9 which operates upon a sprocket wheel 10 mounted on the same shaft which supports the sprocket wheels 5. Rollers 11 are supported at the bottom of the track frames 4 and engage the top of the lower flight of the track 7. A bracket 12 is supported on the top of the track frame 4 and supports the rollers 13 which engage the under surface of the upper flight of the track. The top of the track frame 4 is of a construction, shown more particularly in Figs. 10 and 12 of the drawings, having the outwardly extending horizontal flanges 14 for a purpose which will be later described. The front axle 3 will be of a construction such as is usually employed in tractors of the type disclosed of a yieldable nature so as to allow the front ends of the tracks and track frames to raise and lower due to unevenness in the ground and the rear axle 2 will act as a pivot for allowing such movement of the track and track frame.

As the parts so far described are of well-known construction a further detailed description thereof is not thought necessary.

Figure 1:
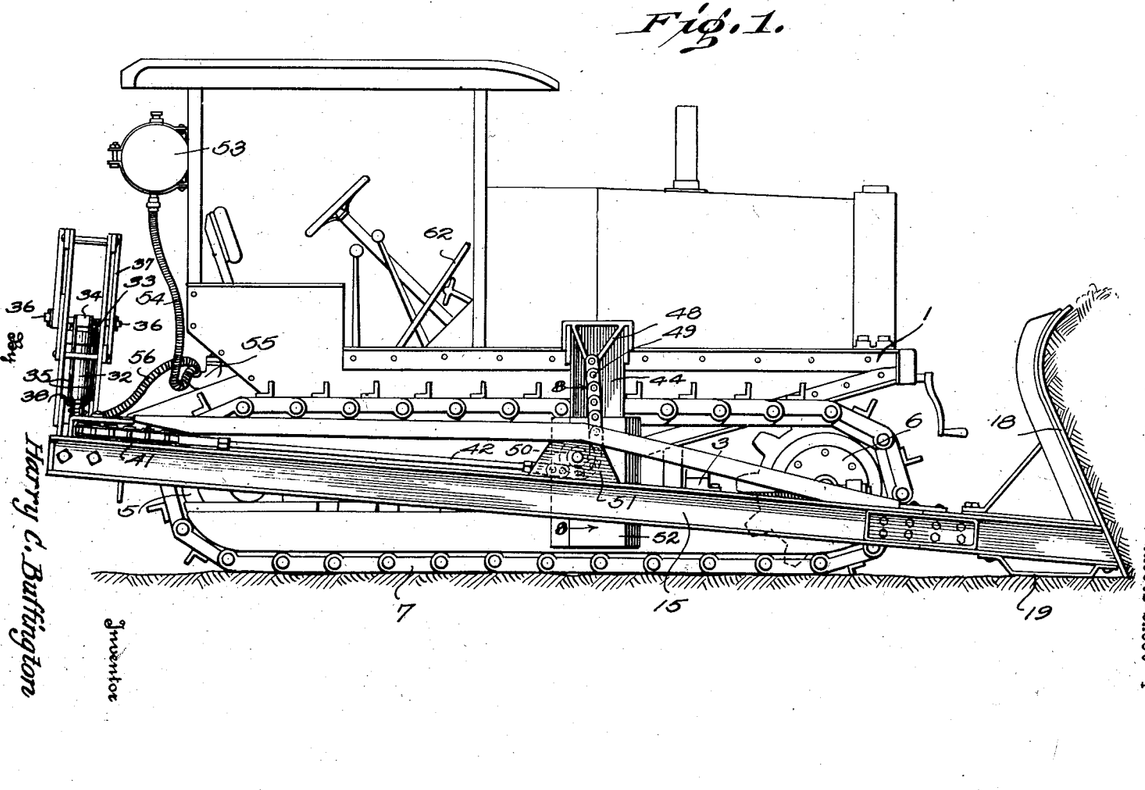
Fig. 1 is a side elevation with the back filler or plow shown in lowered or operative position.
Figure 2:
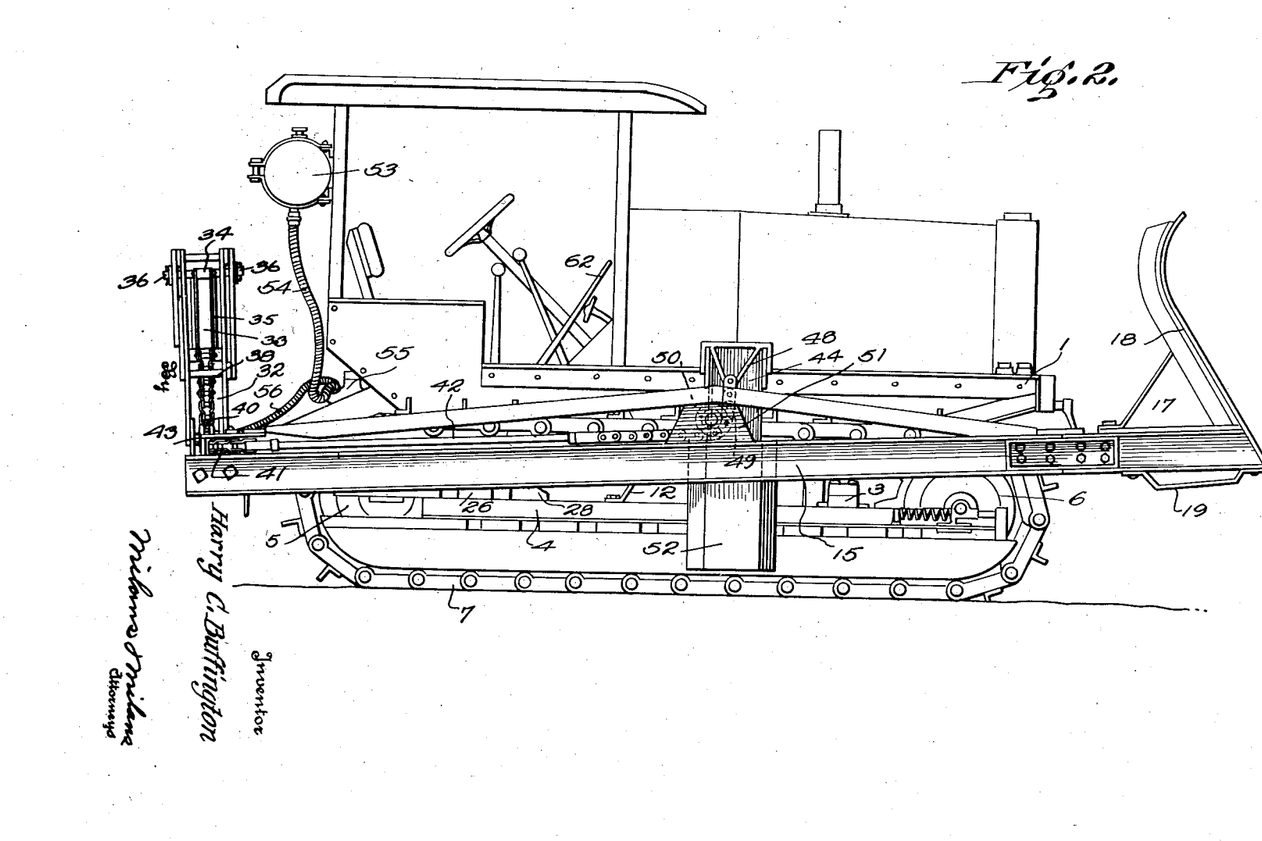
Fig. 2 is a view similar to Fig. 1 with the back filler or plow in raised or inoperative position.
Figure 3:
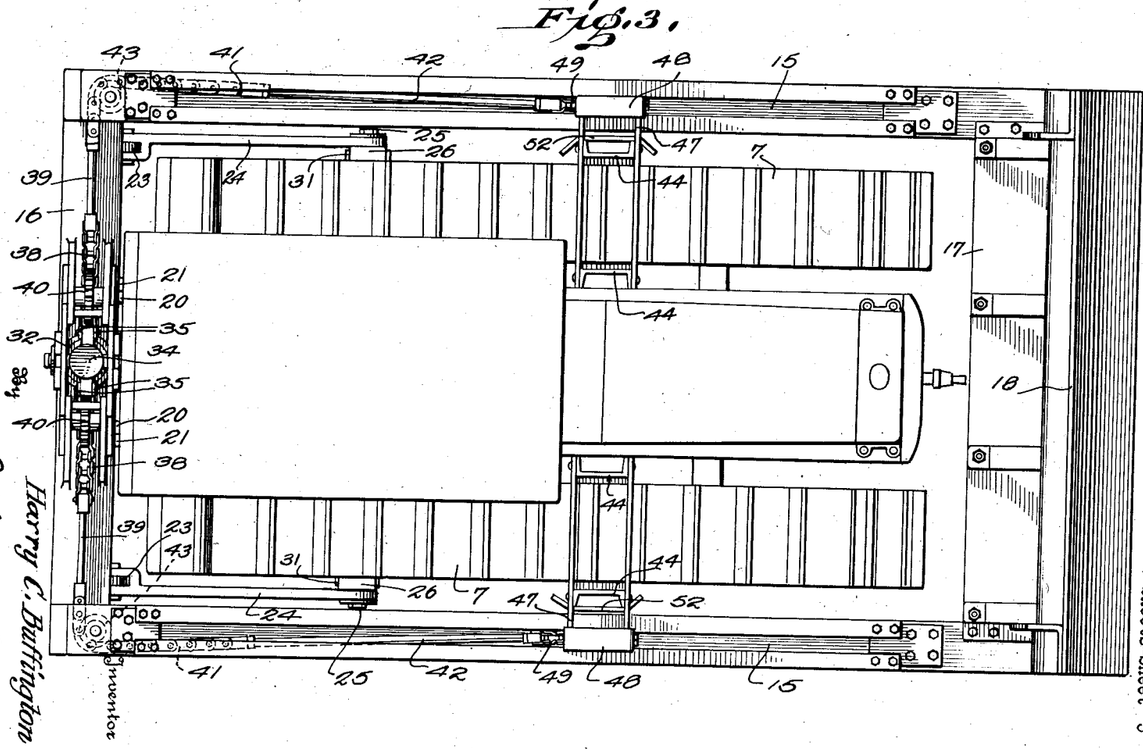
Fig. 3 is a top plan.
Figure 6:
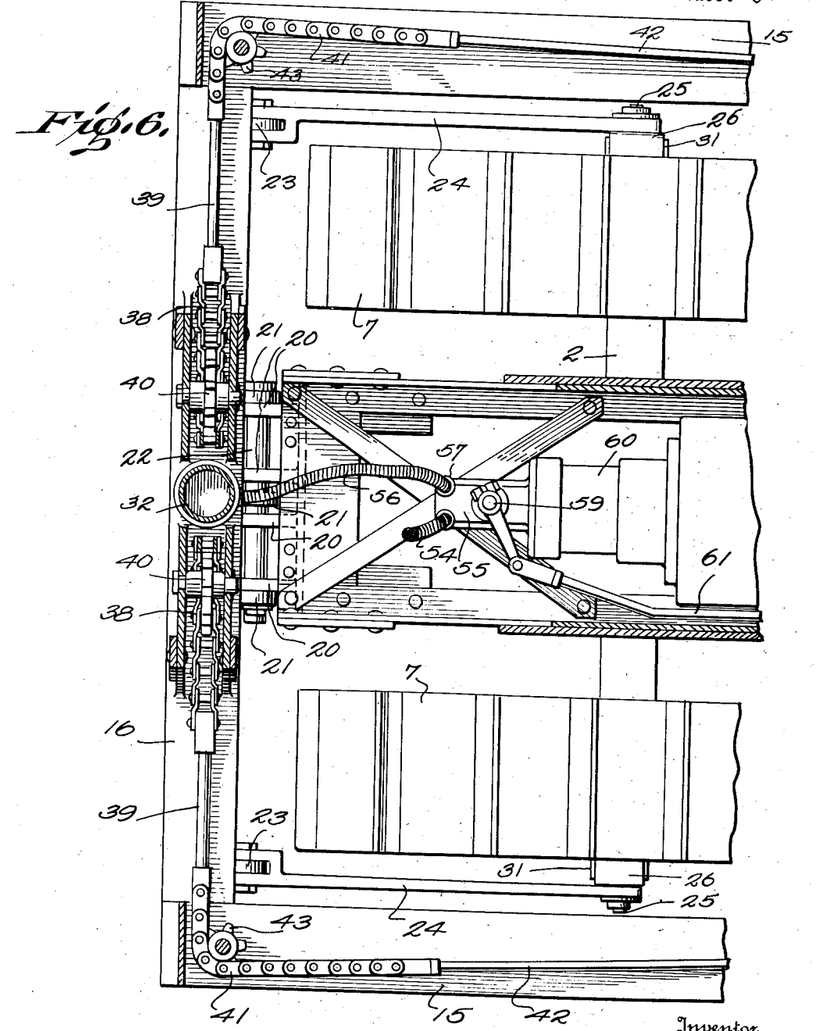
Fig. 6 is a horizontal section on the line 6—6 of Fig. 4 looking in the direction of the arrows.
Figure 11:
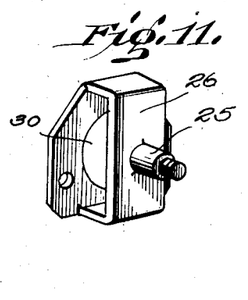

My improved form of back filler or plow, which is connected to and operated by the tractor, includes a frame which consists of the side beams 15, the rear cross beam 16 and the front cross beam 17, to which the blade 18 is secured. Secured to the bottom surfaces of the side beams 15, to the rear of the blade 18, are the runners 19 which, when the frame and blade are in lowered or operative position engage the ground as shown more particularly in Fig. 1 of the drawings. Formed on or secured to the rear end of the tractor are the lugs 20 and formed on or secured to the rear cross beam 16 of the frame of the back filler or plow are the lugs or projections 21, these lugs or projections 21 extending inwardly of the cross beam and adapted to be aligned with the lugs or projections 20, as shown more particularly in Fig. 6 of the drawings. Each of the lugs or projections 20 and 21 are provided with aligned openings through which a bolt 22 passes for pivotally connecting the rear end of the frame of the back filler or plow to the tractor. Also extending inwardly from the cross beam 16, adjacent the inner surface of each of the side beams 15, is a lug or projection 23 to which is pivotally connected one end of a link or bar 24, the opposite end of the link or bar being pivotally connected to a projection 25 formed on the outer face of a bracket 26 of the construction more particularly illustrated in Fig. 11. These brackets 26 are secured, by means of the bolts 27 or other suitable fasteners, to the bearings 28 for the rear axle 2, the bearings 28 being secured by means of the rivets 29 or other suitable fasteners to the upper surface of the track frames 4, as more particularly illustrated in Fig. 10 of the drawings. Each of the brackets 26 is formed in its rear face with an opening 30 through which a nut 31 or the like on the outer end of the axle 2 may pass or extend as shown more particularly in Fig. 10 of the drawings. The brackets 26 are preferably positioned in alignment with the rear axle 2 or adjacent thereto and by this construction the links or bars 24 have their forward ends connected to the track frame of the tractor while their rear ends are connected to the rear cross beam of the back filler or plow frame and the pull or power for the back filler or plow is therefore taken from the track frame instead of from the center draw bar of the tractor as is now usually the case. By this construction an even pull is provided for the frame of the back filler or plow and greater strength is provided. It will be noted that with this construction the position of the back filler or plow is not affected due to the tractor passing over uneven ground.

Figure 4:
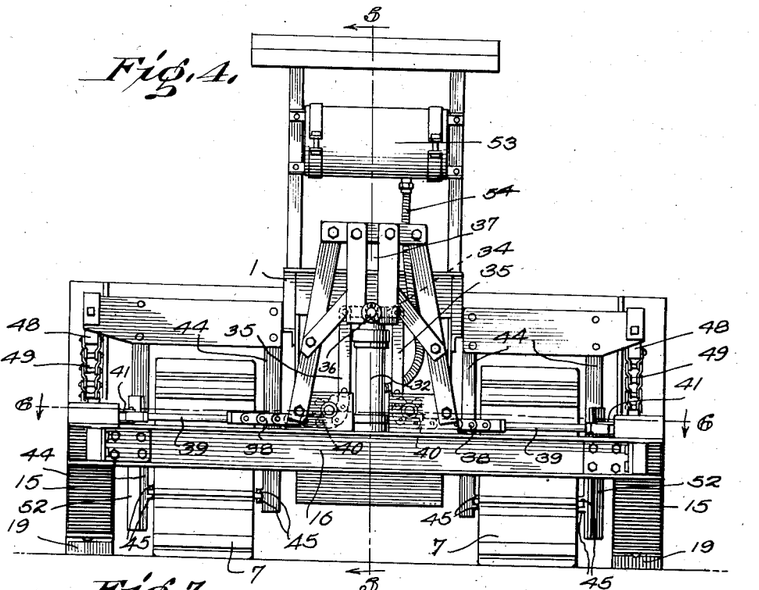
Fig. 4 is a rear elevation.
Figure 5:
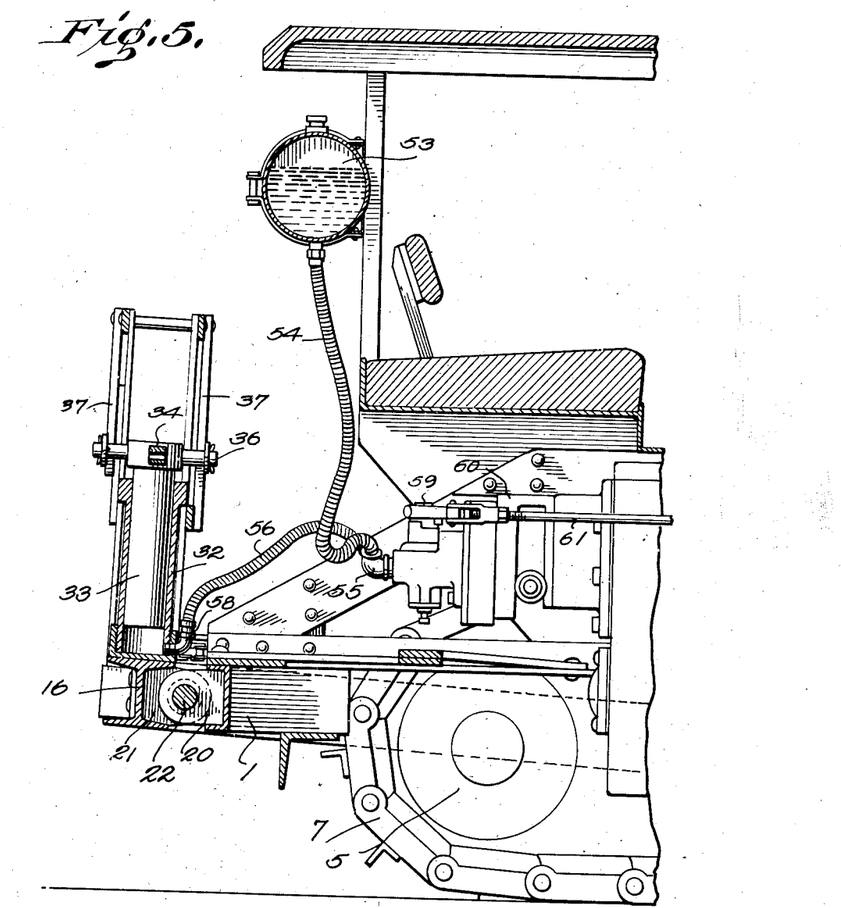
Fig. 5 is a longitudinal vertical section on the line 5—5 of Fig. 4 looking in the direction of the arrows.

Supported on the cross beam 16 of the back filler or plow frame is a jack or ram adapted to be operated from the power of the tractor or by hand. In the drawings I have illustrated the jack or ram of the hydraulic type operated from the power of the tractor but it will be understood that the jack or ram, as stated, might be of a construction to be operated by hand. The jack or ram illustrated consists of a cylinder 32 and piston 33 operable therein, a cross head 34 being secured to the top of the piston with a pair of depending links 35 pivotally connected at each end thereof, as shown more particularly in Fig. 4 of the drawings. Also carried by the piston 33 are the pins or projections 36 which operate in the guides 37. Connected to the lower end of each of the links 35 is one end of a chain 38, the opposite end of the chain being connected to a bar 39 which extends parallel with the top surface of the cross beam 16, as shown more particularly in Figs. 4 and 6 of the drawings. Each of the chains 38 extends beneath and operates around a sprocket wheel 40 as also more clearly shown in Figs. 4 and 6 of the drawings. Secured to the outer ends of each of the rods or bars 39 is one end of a chain 41, the opposite end of the chain being connected to a rod 42 which extends parallel with the side beam 15 of the back filler or plow frame, as shown more particularly in Figs. 1 and 6 of the drawings, the chain 41 passing around a horizontal sprocket 43, as shown more particularly in Fig. 6.

Figure 7:
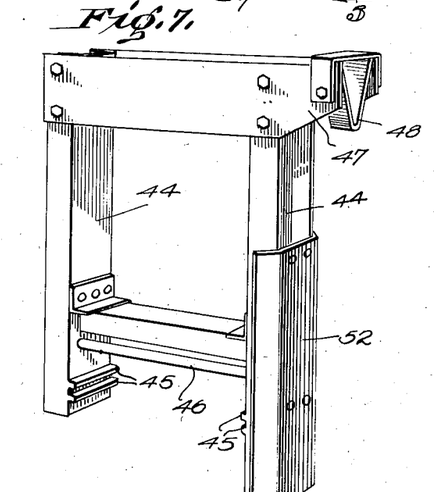
Fig. 7 is a perspective of the standard or frame carried by the tractor and forming a part of the mechanism for raising and lowering the back filler or plow.
Figure 8:
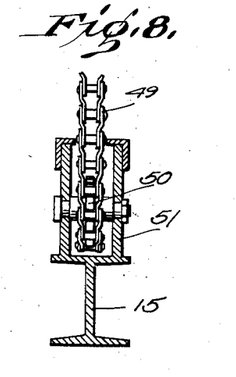
Fig. 8 is a vertical section on the line 8—8 of Fig. 1 looking in the direction of the arrows.
Figure 9:
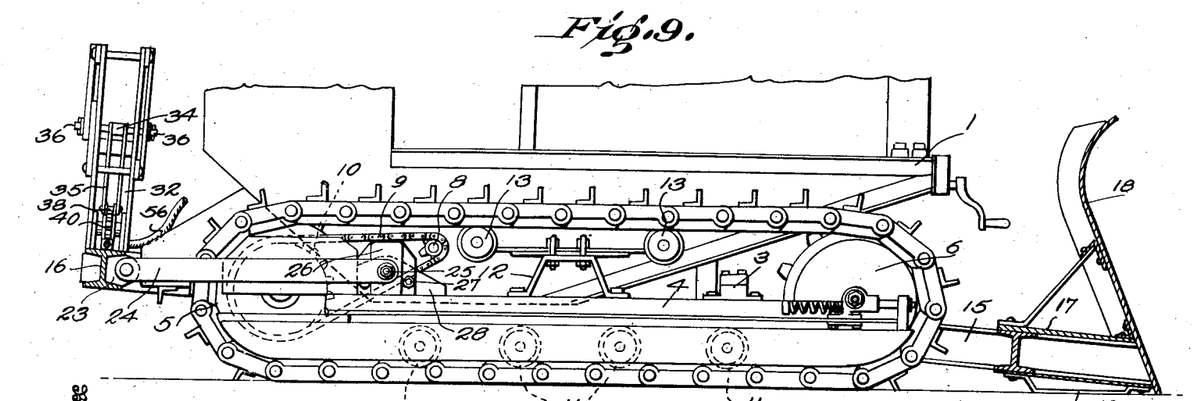
Fig. 9 is a longitudinal section with parts shown in side elevation.
Figure 12:
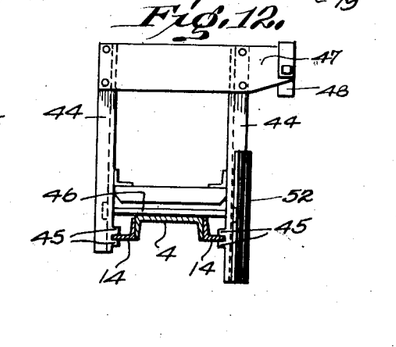
Fig. 12 is a side elevation of the standard or frame illustrated in Fig. 7 and showing the manner in which this standard or frame is secured to the side beam of the frame of the tractor.

Supported by the horizontally extending flanges 14, of the track frames 4, are the standards or frames 44 of the construction shown more particularly in Figs. 7 and 12 of the drawings. These standards or frames have the inwardly extending ledges or ribs 45 which engage the flanges 14, as shown more particularly in Fig. 12 of the drawings, and the sides of the standards or frames are drawn inwardly so that the ledges or ribs 45 are held in engagement with the flanges 14 by means of the bolt 46. Each of the standards or frames 44 has an outwardly extending projecting portion 47 which carries a loop or bail 48 to which is secured one end of a chain 49, the opposite end of the chain being connected to the rod 42 and the chain passing around a sprocket 50 supported by the uprights 51 on the top of the side beam 15. Each of the standards or frames 44 carries a plate 52, which may act as a wear plate for the side beams 15 of the back filler or plow frame. Supported by the tractor is an oil tank 53 and leading from the oil tank is the hose 54 which has its lower end connected to the coupling 55. A hose 56 has its inner end secured to the coupling 57 and its outer end is connected to a coupling 58 which in turn is connected to the cylinder 32 of the jack or ram and communicates with the interior thereof. Passage to the couplings 55 and 57 is controlled by the valve 59 and a pump, of well-known construction, carried by the tractor, is shown at 60. The valve 59 is operated, through means of the rod 61, which is connected to the lever 62 within easy reach of the operator of the tractor. The valve 59 is of a three-way construction and when the lever 62 is pulled rearwardly towards the operator the pump 60 draws the oil from the tank 53 through the hose 54 and the valve 59 directs the same through the hose 56 to the bottom of the cylinder 32. The oil entering the cylinder forces the piston 33 upwardly and as the piston raises the cross head 54, carried thereby, pulls the links 35 upwardly and this movement pulls upon the chains 38 which in turn draw upon the rods 39, the chains 41, the rods 42, and the chains 49. As the upper ends of the chains 49 are secured to the loops or bails 48, of the standards or frames 44, and as the chains 49 pass around the sprocket wheels 50, which are secured to the side beams of the back filler or plow frame, the chains 49 will be shortened and in turn draw the frame of the back filler or plow upwardly to raise the forward end of the frame and position the blade 18 above the ground. When thus raised the lever 62 may be moved back to a neutral position to so position the valve 59 to hold the oil in the cylinder. When it is desired to again lower the back filler or plow frame the lever 62 is moved forwardly to position the valve 59 to allow the pump 60 to draw the oil from the cylinder and to again force the same back into the tank 53.

From the above detailed description it is thought that the construction and operation will be understood. It will be seen that I have provided novel means for raising and lowering the frame of the back filler or plow and have also connected the frame of the back filler or plow to the tractor in such a manner that the strain or pull is taken off of the center draw bar of the tractor and is placed on the tracks of the tractor, links or bars being connected at one end to the track frame of the tracks and at the opposite ends secured to the rear cross beam of the frame of the back filler or plow and adjacent the outer ends thereof. When it is desired to raise and lower the frame of the back filler or plow it is only necessary for the operator to manipulate the lever 62, which controls the valve 59. The valve in turn controls the passage of the oil to the cylinder of the jack or ram, the jack or ram being operated, as has been previously described.

Having fully described my invention what I claim as new and desire to secure by Letters Patent is:—

1. A scraper of the character described including in combination with a tractor having a track frame, a frame connected to the tractor, a blade carried by the frame, a standard connected to the track frame, a member connected to the standard and engageable with the frame, and means carried by the frame for operating said member to raise and lower the frame and blade relative to the tractor.

2. A scraper of the character described including in combination with a tractor having a track frame, a frame connected to the tractor, a blade carried by the frame, a standard carried by the track frame and extending upwardly therefrom, a jack carried by the frame, and flexible means connecting the standard and jack and engageable with the frame whereby the frame may be raised and lowered relative to the tractor upon operation of the jack.

3. A scraper of the character described including in combination with a tractor having a track frame, a frame pivotally connected to the tractor, a blade carried by the frame, a standard connected to and carried by the track frame, a flexible member connected to the standard and engageable with the frame intermediate the ends thereof, and hydraulically controlled means carried by the frame and connected to the member which is connected to the standard and engageable with the frame for operating said member to raise and lower the frame and blade relative to the tractor.

4. A scraper of the character described including in combination with a tractor, a frame surrounding the tractor, and bars at opposite sides of the tractor and pivotally connected to the tractor and frame, for connecting the frame to the tractor.

5. A scraper of the character described including in combination with a tractor having a rear axle, a frame surrounding the tractor, and draw bars at opposite sides of the tractor for connecting the frame to the tractor, the inner ends of the bars being pivotally connected to the tractor adjacent the rear axle thereof.

6. A scraper of the character described including in combination with a tractor, a frame surrounding the tractor, means for pivotally connecting the frame to the tractor, and draw bars on opposite sides of the tractor and connected with the frame adjacent the sides thereof.

7. A scraper of the character described including in combination with a tractor, a frame pivotally connected to the tractor, a blade carried by the frame, brackets secured to the tractor, and draw bars pivotally connected to the brackets and engageable with the frame.

8. A scraper of the character described including in combination with a tractor having a rear axle, a frame pivotally connected to the tractor, brackets secured to the tractor adjacent the rear axle thereof, and draw bars pivotally connected to the brackets and engageable with the frame.

9. A scraper of the character described including in combination with a tractor, a frame pivotally connected to the tractor, a blade carried by the frame, means carried by the frame for raising and lowering the same relative to the tractor, and draw bars connected to the tractor on opposite sides thereof and to the frame.

10. A scraper of the character described including in combination with a tractor, a frame pivotally connected to the tractor, a blade carried by the frame, a standard connected to and carried by the tractor, a jack carried by the frame, means connecting the standard and jack and engageable with the frame for raising and lowering the same relative to the tractor, and draw bars pivotally connected to the tractor on opposite sides thereof and connected to the frame adjacent the sides thereof.

11. A scraper of the character described including in combination with a tractor, a frame surrounding the tractor and pivotally connected thereto, and means at opposite sides of the tractor and pivotally connected to the tractor and frame for connecting the frame to the tractor and for taking the pull from the tractor to the frame adjacent the rear axle of the tractor.

12. A scraper of the character described comprising in combination with a tractor including a flanged track frame, a frame pivotally connected to the tractor, a blade carried by the frame, a standard supported by the track frame and formed and adapted to engage the flanges thereof, a member connected to the standard and engageable with the frame, and means carried by the frame for operating said member to raise and lower the frame and blade relative to the tractor.

13. A scraper of the character described comprising in combination with a tractor, a frame surrounding the tractor and pivotally connected thereto, said frame including side and end beams, a blade secured to that end of the frame removed from the pivot point of the frame with the tractor, a jack supported by that end beam of the frame adjacent the pivot point, a standard connected to each side beam of the frame intermediate the ends thereof, and means connected to each of the standards and to the jack, and engageable with the frame, for raising and lowering the frame and blade relative to the tractor upon operation of the jack.

In testimony whereof I hereunto affix my signature.

HARRY C. BUFFINGTON.